Dec. 18, 1923.  W. S. PERRY  1,477,662
FRUIT TOOL
Original Filed June 13, 1922
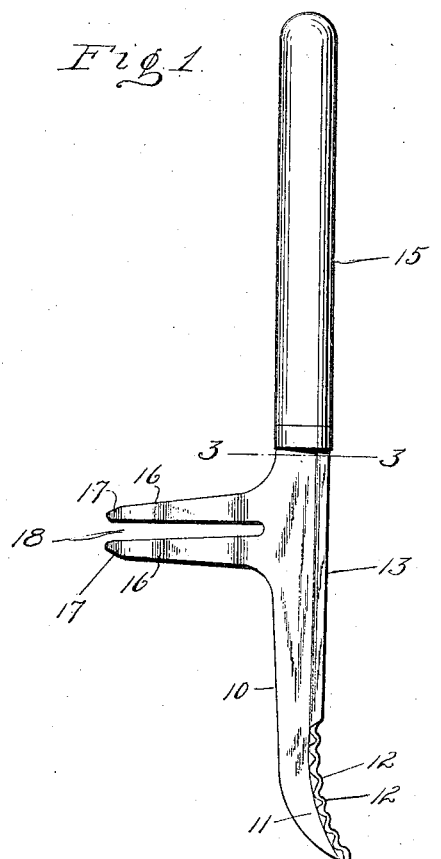
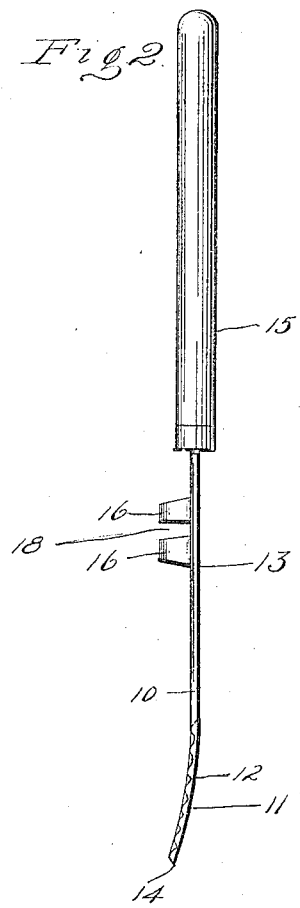
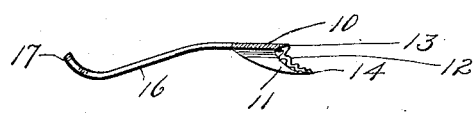
Inventor
William S Perry
By George E Hall
Atty Patented Dec. 18, 1923.

1,477,662

UNITED STATES PATENT OFFICE.

WILLIAM S. PERRY, OF NEW HAVEN, CONNECTICUT, ASSIGNOR TO THE WOPECO MACHINE COMPANY, OF NEW HAVEN, CONNECTICUT, A CORPORATION OF CONNECTICUT.

FRUIT TOOL.

Application filed June 13, 1922, Serial No. 568,062. Renewed July 26, 1923.

*To all whom it may concern:*

Be it known that I, WILLIAM S. PERRY, a citizen of the United States, residing at New Haven, in the county of New Haven and State of Connecticut, have invented certain new and useful Improvements in Fruit Tools, of which the following is a specification, reference being had therein to the accompanying drawings.

This invention relates to fruit tools the principal object of which is to provide convenient means for either coring, slicing or seeding fruit for table or other use, or any combination thereof.

Among other aims and objects of the invention may be recited the provision of a device of the character mentioned with a view to compactness and simplicity, and wherein the cost of production is small and efficiency and operation high.

The construction of my improved device will be apparent from an inspection of the accompanying drawings in connection with the description thereof hereinafter contained, wherein a preferred embodiment of the invention is disclosed for the purpose of imparting an understanding of the same.

In the drawings;

Figure 1 is an elevation of my improved fruit tool;

Figure 2 is an elevation thereof looking toward the right of Figure 1; and

Figure 3 is a sectional view thereof, taken generally upon line 3—3 of Figure 1.

Having more particular reference to the drawings and in connection with which like reference characters refer to corresponding parts in all of the views, 10 represents the blade having a curved end portion 11 that terminates in a point 14. This portion is curved in two directions as shown respectively in Figures 1 and 2 and has teeth 12 upon its inner edge that form a continuation of the cutting edge 13 of the blade.

The handle 15 fixed on the end of the blade 10 provides convenient means for handling and operating the tool.

Projecting laterally from one edge of the blade 10 are the substantially parallel tines 16 which are curved substantially as shown in Figure 3 and terminating in the curved ends 17 that have an open space 18 therebetween. The tines are tapered throughout their lengths so that the inner sides of same conjointly form a relatively narrow and wedge-like space.

The tines will perform their function without having curved outer ends, but I prefer to have them so formed as it tends to efficiency in operation. The tines can be entirely omitted, if desired, in which case the seeds may be removed by the pointed end of the blade.

This fruit tool is especially designed for use in coring, seeding and slicing grape fruit, although it may be used for other purposes and with fruit of a different structure.

After the grape fruit is cut into two parts the central core is first removed by projecting the blade into the fruit the proper distance with the pointed end 14 downwardly, and then moving the tool around the outside of the core. This action cuts the fiber leading from the core. As the pointed end 14 projects inwardly under the core, the core itself is also severed from the fruit skin. When the tool is withdrawn the core is lifted out at the same time. The seeds are then removed by the ends 17 of the tines 16, the slot 18 therebetween facilitating the projecting of the tines thereunder and manipulation around the fiber back of the fruit. After the seeds are removed, the fruit is sliced radially by passing the blade therethrough, the teeth 12 and sharpened edge 13 of the blade facilitating the operation, and these sections are then separated from the fruit skin along the inner wall thereof by passing the blade therebetween. The curved lower end of the blade passes under the fruit and severs it from the skin while the substantially straight portion of the blade is performing the same function along the inner wall.

This tool is comparatively simple, will perform all the necessary operations to prepare a grape fruit or similar fruit for table or other use, is simple in its structure and economical to produce, and is most efficient in its operation.

Minor changes and alterations may be made within my invention, aside from those herein suggested, and I would therefore have it understood that I do not limit myself to the exact construction herein shown and described, but claim all that falls fairly within the spirit and scope of the appended claims.

What I claim as new and desire to secure by Letters Patent, is:

1. A fruit tool for coring, slicing and seeding fruit having a sharpened blade curved and pointed at one end with teeth upon the inner edge of the curved portion.

2. A fruit tool having a sharpened blade curved to a point at its free end part and having teeth on the inner edge of the curved part and said curved part being transversely curved.

3. A fruit tool having a sharpened blade curved at one end with teeth upon the inner edge of the curved portion, the toothed portion of said blade being an extension of the sharpened portion thereof.

4. A fruit tool having a sharpened blade which has its free end concaved and formed with teeth, said free end of the blade being transversely curved and the teeth forming continuations of the sharpened part of the blade.

In testimony whereof, I have hereunto affixed my signature.

WILLIAM S. PERRY.